Oct. 25, 1932.                L. R. LUDWIG ET AL                1,884,021
COMMUTATING DEVICE FOR DYNAMO ELECTRIC MACHINES
Filed Sept. 18, 1929
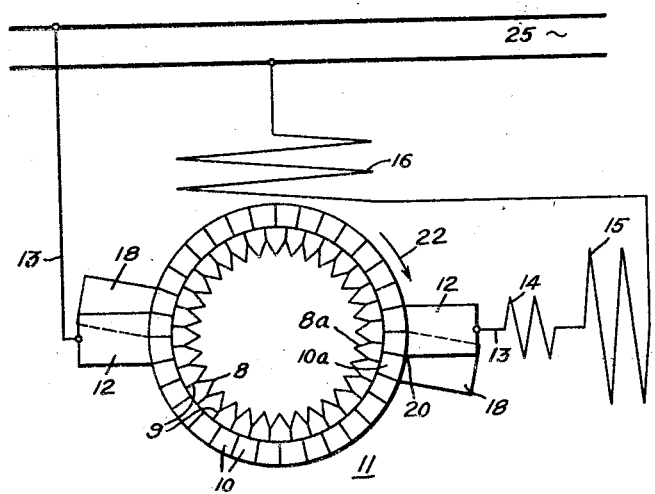
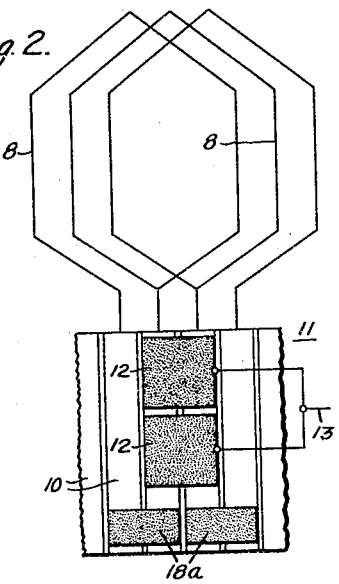
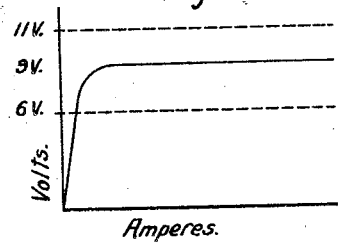
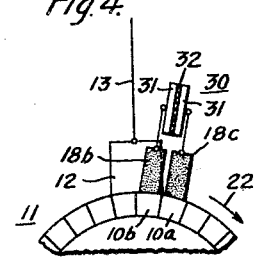
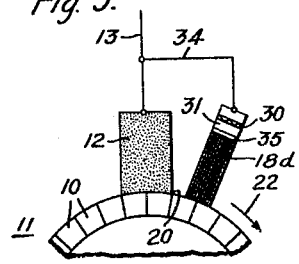
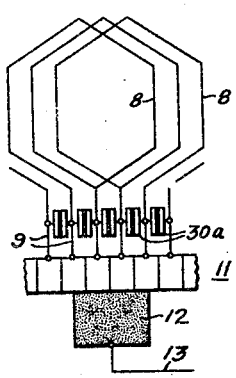
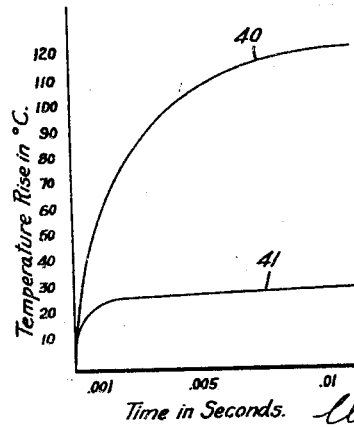
INVENTORS.
Leon R. Ludwig &
Joseph Slepian.
BY
ATTORNEY Patented Oct. 25, 1932

1,884,021

UNITED STATES PATENT OFFICE

LEON R. LUDWIG AND JOSEPH SLEPIAN, OF WILKINSBURG, PENNSYLVANIA, ASSIGNORS TO WESTINGHOUSE ELECTRIC AND MANUFACTURING COMPANY, A CORPORATION OF PENNSYLVANIA

COMMUTATING DEVICE FOR DYNAMO-ELECTRIC MACHINES

Application filed September 18, 1929. Serial No. 393,423.

Our invention relates to means for improving the commutation of dynamo-electric machines, and particularly series single-phase motors.

The principal object of our invention is to provide means for preventing the occurrence of a sparking potential of eleven volts at or under the brushes during the operation of a machine, and particularly to provide a variable-resistance, critical-voltage means having a voltage drop between six and eleven volts for all currents except the smallest currents.

A further object of our invention is to provide a brush-combination for dynamo-electric machines whereby a main brush or brushes having low resistivity may be utilized for the conduction of the main currents at high current density, while a high-resistance, low-current-density auxiliary brush, trailing the main brush, is utilized to correct the insufficiencies of commutation at the main brush.

A further object of our invention is to provide an improved brush which is designed to prevent the attainment of an ionization voltage of eleven volts by reason of what we call its transient contact drop, as will be subsequently described, particularly in reference to high-resistance brushes having unusually high static brush-drop characteristics.

With the foregoing and other objects in view, our invention consists in the structures, combinations, and systems hereinafter described and claimed, with reference to the accompanying drawing, wherein Figure 1 is a diagrammatic view of a single-phase commutator motor embodying our invention, Fig. 2 is a detail diagrammatic view illustrating a feature of the same motor, with a slight change indicating the applicability of the invention to reversible motors, Fig. 3 is a curve chart referred to in the description, Figs. 4, 5 and 6 are detail views indicating modifications of our invention, and Fig. 7 is another curve chart which is referred to in the description.

Our invention is applicable to any dynamo-electric machine of the commutator type, but it is particularly applicable to alternating-current commutator motors, where the commutating problem is particularly severe.

In Fig. 1 our invention is illustrated as being applied to a 25-cycle, single-phase commutator motor comprising an armature winding 8, connected by commutator leads 9 through the bars 10 of a commutator cylinder 11, from which current is collected by means of two main brushes or groups of brushes 12 which are connected to terminal leads 13 by means of which the armature current is led through a commutating coil 14, a compensating or neutralizing winding 15 and an exciting winding 16 mounted on the stator element of the motor.

According to our invention, the motor is provided with auxiliary trailing brushes 18 having an unusually high double-contact brush-drop. By double-contact brush-drop, we mean the voltage drop from one commutator bar into one half of the brush and out again to an adjacent commutator bar when the brush is spanning both bars and carrying the rated brush current.

Brushes for dynamo-electric machines ordinarily have a double-contact brush-drop ranging from a minimum of about .7 volt on some direct-current machines to a maximum of about 2.5 volts on some alternating-current machines. This brush-drop ordinarily remains quite constant, dropping off only very slightly as the current is reduced from its full-load value, until quite small currents are reached. The reason for this peculiar voltage-current characteristic of brushes has heretofore been the subject of much speculation by experts in the fields of brushes, dynamo-electric machines and physics. As a result of an intensive study and investigation, we have developed our own theories on brush contact-drops, and as our present invention is believed to involve such theories almost entirely, they will be very briefly outlined.

We draw a distinction between the conditions of brush-drop resulting from steady current flow, and the conditions resulting from transients. Considering first the static brush-drop characteristic, we believe that the current is carried, at the contact with the copper bar, by means of a large number of small contact points which move about over the surface of the brush, most of the surface being covered by a very thin film of adsorbed gas which insulates the major portion of the contact surface of the brush from the commutator. As the current increases, the temperature of these small contact points increases, thus driving off the adsorbed gas over a wider area around each of the contact points, and allowing more intimate contact between the brush and the commutator cylinder. By this means, the contact drop remains about constant, as the current increases. The foregoing, in rough outline, is our theory of static brush-drop characteristics. The performance of brushes under transient conditions will be discussed later on.

In a dynamo-electric machine, when the trailing brush-tip 20 of the main brush 12 quits a commutator bar 10a, as indicated in Fig. 1, with the commutator turning in the direction indicated by the arrow 22, a spark will be produced if a voltage higher than eleven volts occurs at this point when the contact is broken. It is not possible or feasible to regulate the electrical design of a machine so that no voltage is induced between the trailing tip of the brush and the commutator bar which it is just quitting, under all conditions of load and speed. If this voltage is less than eleven volts, no sparking can occur; if it is more, sparking will occur. Our invention relates to means for preventing this voltage from becoming more than eleven volts, whatever may be the electrical design, load or speed of the machine.

According to our invention, a high-resistance auxiliary trailing brush 18 is utilized, to span the trailing brush-tip 20 and the armature coil 8a affected thereby, said auxiliary trailing brush being so designed as to have a double-contact peak-voltage brush-drop of between 6 volts and 11 volts, preferably around 9 volts, as shown by the full-line curve in Fig. 3. The 6-volt limit is mentioned, not only because it is about half of the maximum permissible voltage, which will be approached in the limiting design of a machine, but because it is also the value of the highest voltages that are induced in any armature coil, between adjacent commutator bars, in the region near the trailing brush-tip 20, except at the instant when the trailing brush-tip quits a commutator bar under other than zero-current conditions, at which time a sharp voltage kick is produced by the reactance of the armature coil.

Thus, if the auxiliary trailing brush 18 has a volt-ampere characteristic as shown in the full-line curve of Fig. 3, it will not short-circuit the armature coil 8a under normal conditions when the voltage is less than 6 volts, because, as will be seen from the curve, the current through the brush is then quite small.

At the instant when the trailing tip of the main brush quits a commutator bar, as 10a, the trailing brush will be called upon to carry the current which was flowing in the bar 10a at the moment when the main brush broke contact therewith, such current being possibly as high as $\frac{1}{10}$ of the main brush current in an extreme case. From the curve in Fig. 3, it will be seen that the auxiliary brush can carry this current easily without permitting the brush-drop between adjacent commutator bars to be more than about 9 volts.

It will be understood that the main brush 12 may be as long, axially, as may be necessary, or may be split up into as many brushes as may be desirable, all located in the same axial plane, as indicated in Fig. 2.

It will be further understood that when the motor is a reversible motor, the auxiliary brush 18a may be made wide enough, in a circumferential direction, to span both the leading and the trailing brush tips of the main brush or brushes, as indicated in Fig. 2. Here, again, the auxiliary brush may be split, either axially or circumferentially as shown in Fig. 2, for convenience in mounting, or in order to maintain a uniform brush spring pressure.

In Fig. 4, the auxiliary trailing brush is split circumferentially into two portions, one portion 18b making contact with the commutator bar which is engaged by the trailing side of the main brush 12, and the other portion 18c making contact with the bar 10a which has just been quit by the main brush 12. In this embodiment of our invention the desired volt-ampere characteristic of Fig. 3 is obtained, in part, by a critical-voltage, imperfect-contact device 30 having similar properties, thereby making it possible to utilize an auxiliary-brush material having lower resistance than in the case of the single auxiliary brush of Fig. 1. The critical-voltage, imperfect-contact device 30 may be made up of different materials which have been used for radio detectors and it may comprise, for example, two graphite plates 31, an inch in diameter, separated by carborundum crystals 32 held by an insulated bolt or clamp.

In the embodiment of our invention heretofore described, the auxiliary brushes, whether single brushes or composite brushes, have been insulated from the main brushes 12 and from the terminal conductors 13 of the machine, and the auxiliary brushes have been displaced axially from the main brushes 12.

In Fig. 5, the auxiliary brush 18d does not overlap the main brush, but is spaced circumferentially therefrom by a distance which is less than the width of one commutator bar, being joined to the main brush, or to its associated terminal lead 13, by a conductor 34 which may, or may not, include a critical-voltage imperfect-contact device 30 such as has been already described. By way of illustration, the auxiliary brush 18d of Fig. 5 is also shown as having a laminated construction obtained by stacking a plurality of $\frac{1}{32}$ inch sheets of carbon held together with waterglass. The top of the laminated brush 18d is copper sprayed, as indicated at 35, to provide a good contact with the carbon plate 31 o fthe critical-voltage device 30, which is placed directly on top of the auxiliary brush. It will be apparent that the auxiliary brush 18d of Fig. 5, in conjunction with the conductor 34 joining it to the main brush, provides a variable-resistance, critical-voltage circuit around the trailing brush-tip 20, with the functions and results heretofore described.

In many alternating-current comutator motors, such as are used in railway service, the maximum voltage induced in an armature coil, between adjacent comutator bars, even under the main field coils, does not exceed 6 volt, so that a critical-voltage contact device having a volt-ampere characteristic such as illustrated in Fig. 3, could be permanently connected across each armature coil, as indicated by the device 30a connected between the successive pairs of commutator leads 9 in Fig. 6, without drawing more than very small leakage currents, except during the instant of commutation as hereinabove explained. In this case, the main brushes 12 are utilized without auxiliary trailing brushes.

By the use of our invention, it becomes possible to utilize a low-resistance brush, which can be worked at high current-density, for the main brush, the imperfections of commutation of the main brush being then corrected by a high-resistance brush, or in general, by a variable-resistance, critical-voltage circuit shunting the trailing brush tip of the main brush. Our auxiliary brush has preferably at least five or ten times the resistivity of the main brush, particularly in the transverse plane of the auxiliary brush. We have found that an auixiliary brush having a resistivity of .024 ohm per inch cube, or .06 ohm per centimeter cube, at the operating temperature, is satisfactory, with a possible desirable range of resistivities of between .01 and .05 ohms per inch cube.

It is important that the brushes, particularly the high-resistance trailing brushes, where such properties are hard to obtain, shall have a low value of what we call the transient brush-drop characteristic. It has been found that if the current in a brush is increased with sufficient rapidity, the contact points between the brush and the commutator will be insufficient to carry this increased current. In other words, the resistance of the contact will not decrease as rapidly as the current increases, as has been described above in connection with the static brush-drop characteristic, with the result that the contact voltage may momentarily mount to very high values, producing voltage gradients considerably in excess of eleven volts, whereby ionization-by-collision is produced in the gaseous layer between the brush and the commutator surface thereby producing arcing underneath the brush.

From the nature of the brush-contact-drop as previously explained, it can be seen that the time lag in the change in the contact resistance, upon the occurrence of a sudden current-change, may be due to two causes: Either because a certain time is required to raise the temperature of the contact points, and thus to drive off the gaseous film so as to enlarge the contact points; or because there is a time lag in the adsorption process itself.

In Fig. 7, the upper curve 40 shows the calculated values of the heating of the contact points of an ordinary brush, plotting the temperature-rise in degrees C., in relation to time. This curve shows that the contact point will reach about 80% of its final temperature in approximately 10 milli-seconds, which is about a quarter-cycle of the main line frequency. It is noted, furthermore, that the current-densities are changing in the brush at commutator-bar frequency superimposed on line-frequency current, so that it will be evident that the time required for heating the contact point is very much larger than the time of the change of current-density within the brush. Therefore, it can be seen that if the current-density changes rapidly within the brush, quite high contact-voltages might be developed.

The effects of these high voltages under the brush are to burn away the brush, to blacken the commutator and to cause abnormal brush wear. Considerable experimental evidence has been obtained indicating that this phenomenon is a real difficulty.

There are a number of ways in which these high transient contact-voltages may be avoided. Thus, if the contact points of the brush are reduced in size, as by utilizing a finer mesh material in the brush construction, the contact points would, of course, heat more rapidly and restrict the transient voltage to a lower value. Also, a greater thermal conductivity (which is usually hard to obtain with high electrical resistivities, but which can be obtained by the use of sufficient pressures in molding the carbon brushes, and by other expedients known to brush manufacturers), and a higher electrical resistivity, as well as a higher density of brush material, would shorten the time required for heating the contact points.

The lower curve 41 in Fig. 7 has been plotted for a brush having what might be termed ideal characteristics, in accordance with our invention, from which it will be seen that the time necessary for a contact point to reach 80% of its steady-state value has been reduced to less than 1 milli-second. As the contact points have a different distinctive temperature for each value of the brush current, and a distinct value of resistance for each temperature, the transient temperatures may readily be estimated from an oscillographic determination of the transient resistances of the brush contacts.

We claim as our invention:

1. In a commutator-type dynamo-electric machine having a plurality of commutator-brush terminals, the combination, with each terminal, of one or more main brushes disposed in an axial plane and connected to said terminal, and a composite auxiliary brush having two portions on opposite sides of the trailing brush-tip of the main brush or brushes, said two portions being joined by a critical-voltage, imperfect-contact device having the property of carrying all but the smallest currents at a nearly constant voltage-drop.

2. In a commutator-type dynamo-electric machine having a plurality of commutator-brush terminals, the combination, with each terminal, of one of more main brushes disposed in an axial plane and connected to said terminal, and a composite auxiliary brush having two portions on opposite sides of the trailing brush-tip of the main brush or brushes, said two portions being joined by a critical-voltage, imperfect-contact device having the property of carrying substantial amounts of current only at voltages exceeding about 6 volts.

3. In a commutator-type dynamo-electric machine having a plurality of commutator-brush terminals, the combination, with each terminal, of one or more main brushes disposed in an axial plane and connected to said terminal, and means for providing an auxiliary circuit-connection between a commutator bar under the main brush or brushes adjacent to the trailing brush-tip and a commutator bar just quitted by the main brush or brushes, said auxiliary circuit-connection comprising a critical-voltage, imperfect-contact device having the property of carrying substantial amounts of current only at voltages exceeding about 6 volts.

4. In a commutator-type dynamo-electric machine having a plurality of commutator-brush terminals, the combination, with each terminal, of one or more main brushes disposed in an axial plane and connected to said terminal, and means for providing an auxiliary circuit-connection between a commutator bar under the main brush or brushes adjacent to the trailing brush-tip and a commutator bar just quitted by the main brush or brushes, said auxiliary circuit-connection comprising a critical-voltage, imperfect-contact device having the property of carrying substantial amounts of current only at voltages exceeding about 6 volts, and limiting the peak-voltage drop between adjacent commutator bars to a value less than 11 volts.

5. In a commutator-type dynamo-electric machine having a plurality of commutator-brush terminals, the combination, with each terminal, of one or more main brushes disposed in an axial plane and connected to said terminal, and means, including an auxiliary brush and a critical-voltage, imperfect-contact device, for providing a critical-voltage circuit-connection between a commutator bar under the main brush or brushes adjacent to the trailing brush-tip and a commutator bar just quitted by the main brush or brushes, said critical-voltage circuit-connection having a peak-voltage drop of between 6 and 11 volts at all but the smallest current values.

6. In a commutator-type dynamo-electric machine having a plurality of commutator-brush terminals, the combination, with each terminal, of one or more main brushes disposed in an axial plane and connected to said terminal, and an auxiliary circuit including an auxiliary brush and a critical-voltage variable-impedance device electrically connected between said auxiliary brush and the main brush or brushes for shunting the coil undergoing commutation by said main brush or brushes, said auxiliary circuit having a variable-resistance characteristic changing in such way as to maintain a substantially constant voltage, in the vicinity of said main brush or brushes, at a predetermined value to avoid sparking.

7. In a commutator-type dynamo-electric machine having a plurality of commutator-brush terminals, the combination, with each terminal, of one or more main brushes disposed in an axial plane and connected to said terminal, and means including an auxiliary brush and a critical-voltage variable-impedance device electrically connected between said auxiliary brush and the main brush or brushes for providing a critical-voltage circuit-connection between a commutator bar under the main brush or brushes adjacent to the trailing brush-tip and a commutator bar just quitted by the main brush or brushes, said critical-voltage circuit-connection having a peak-voltage drop of between 6 and 11 volts at all but the smallest current values, and said auxiliary brush having a transient contact drop at any one point, under operating conditions, less than the voltage necessary to produce ionization of the gaseous film under the auxiliary brush.

8. A rotating electric machine having a multi-bar commutator member, a plurality of main carbonaceous brushes bearing thereon, terminal leads connected to said main brushes for carrying current to and from said commutator member, and auxiliary carbonaceous brushes bearing on said commutator member and displaced, in an axial direction, with respect to the corresponding main brushes, but overlapping, in a circumferential direction, at least one edge of the respective corresponding main brushes, supporting-means for insulating said auxiliary brushes from said main brushes, said auxiliary brushes having a relatively high transverse resistivity at least somewhere around five times that of the main brushes, or higher, and having a smaller grain-size and a higher density than said main brushes.

9. A rotating electric machine having a multi-bar commutator member, a plurality of main brushes bearing thereon for carrying current to and from said commutator member, and insulated auxiliary brushes bearing on said commutator member and displaced, in an axial direction, with respect to the corresponding main brushes, but overlapping, in a circumferential direction, at least one edge of the respective corresponding main brushes, said auxiliary brushes having a transverse resistivity higher than .01 ohm per inch cube and having such small grain-size, high density and high thermal conductivity as to be able to reach within 80% of its steady-state contact drop under sliding contact conditions within 2 milli-seconds.

10. A rotating electric machine having a multi-bar commutator member, a plurality of main brushes bearing thereon for carrying current to and from said commutator member, and insulated auxiliary brushes bearing on said commutator member and displaced, in an axial direction, with respect to the corresponding main brushes, but overlapping, in a circumferential direction, at least one edge of the respective corresponding main brushes, said auxiliary brushes having a transverse resistivity higher than .01 ohm per inch cube and having such small grain-size, high density and high thermal conductivity as to be able to reach within 80% of its steady-state contact drop under sliding contact conditions within 1 milli-second.

11. A rotating electric machine having a multi-bar commutator member, a plurality of main brushes bearing thereon for carrying current to and from said commutator member, and insulated auxiliary brushes bearing on said commutator member and displaced, in an axial direction, with respect to the corresponding main brushes, but overlapping, in a circumferential direction, at least one edge of the respective corresponding main brushes, said auxiliary brushes having such high electrical resistance, small grain-size, high density and high thermal conductivity as to be able to reach within 80% of its steady-state contact drop under sliding contact conditions within 2 milli-seconds.

12. A rotating electric machine having a multi-bar commutator member, a plurality of main carbonaceous brushes bearing thereon for carrying current to and from said commutator member, and insulated auxiliary carbonaceous brushes bearing on said commutator member and displaced, in an axial direction, with respect to the corresponding main brushes, but overlapping, in a circumferential direction, at least one edge of the respective corresponding main brushes, said auxiliary brushes having a transverse resistivity higher than .01 ohm per inch cube and having such small grain-size, high density and high thermal conductivity as to be able to reach within 80% of its steady-state contact drop under sliding contact conditions with 2 milli-seconds, said main brushes having a relatively low resistivity at least somewhere around one-fifth of the transverse resistivity of the auxiliary brushes, or lower.

13. A rotating electric machine having a multi-bar commutator member, a plurality of main carbonaceous brushes bearing thereon for carrying current to and from said commutator member, and insulated auxiliary carbonaceous brushes bearing on said commutator member and displaced, in an axial direction, with respect to the corresponding main brushes, but overlapping, in a circumferential direction, at least one edge of the respective corresponding main brushes, said auxiliary brushes having a transverse resistivity higher than .01 ohm per inch cube and having such small grain-size, high density and high thermal conductivity as to be able to reach within 80% of its steady-state contact drop under sliding contact conditions within 1 milli-second, said main brushes having a relatively low resistivity at least somewhere around one-fifth of the transverse resistivity of the auxiliary brushes, or lower.

14. A rotating electric machine having a multi-bar commutator member, a plurality of main carbonaceous brushes bearing thereon for carrying current to and from said commutator member, and insulated auxiliary carbonaceous brushes bearing on said commutator member and displaced, in an axial direction, with respect to the corresponding main brushes, but overlapping, in a circumferential direction, at least one edge of the respective corresponding main brushes, said auxiliary brushes having such high transverse electrical resistance, small grain-size, high density and high thermal conductivity as to be able to reach within 80% of its steady-state contact drop under sliding contact conditions within two milli-seconds, said main brushes having a relatively low transverse resistivity at least somewhere around one-fifth of that of the auxiliary brushes, or lower.

15. A rotating electric machine having a multi-bar commutator member, a plurality of main carbonaceous brushes bearing thereon for carrying current to and from said commutator member, and insulated auxiliary carbonaceous brushes bearing on said commutator member and displaced, in an axial direction, with respect to the corresponding main brushes, but overlapping, in a circumferential direction, at least one edge of the respective corresponding main brushes, said auxiliary brushes having a relatively high transverse electrical resistance, small grain-size of its constituent carbon material, high density and high thermal conductivity, as compared to said main brushes.

16. A rotating electric machine having a multi-bar commutator member, a plurality of main carbonaceous brushes bearing thereon for carrying current to and from said commutator member, and insulated auxiliary carbonaceous brushes bearing on said commutator member and displaced, in an axial direction, with respect to the corresponding main brushes, but overlapping, in a circumferential direction, at least one edge of the respective corresponding main brushes, said auxiliary brushes having a relatively small grain size of its constituent carbon material and high density, as compared to said main brushes.

17. A rotating electric machine having a multi-bar commutator member, a plurality of main carbonaceous brushes bearing thereon for carrying current to and from said commutator member, and insulated auxiliary carbonaceous brushes bearing on said commutator member and displaced, in an axial direction, with respect to the corresponding main brushes, but overlapping, in a circumferential direction, at least one edge of the respective corresponding main brushes, said auxiliary brushes having a double-contact drop, at all but the very smallest currents, of the order of 6 to 11 volts.

18. A rotating electric machine having a multi-bar commutator member, a plurality of main carbonaceous brushes bearing thereon for carrying current to and from said commutator member, and insulated auxiliary carbonaceous brushes bearing on said commutator member and displaced, in an axial direction, with respect to the corresponding main brushes, but overlapping, in a circumferential direction, at least one edge of the respective corresponding main brushes, said auxiliary brushes having a double-contact drop, at current-values corresponding to any load condition of said machine, of the order of approximately 9 volts.

19. In a commutator-type dynamo-electric machine having a plurality of commutator-brush terminals, the combination, with each terminal, of one or more main brushes disposed in an axial plane and connected to said terminal, and a critical-voltage, imperfect-contact device for providing an auxiliary circuit-connection between a commutator bar under the main brush or brushes adjacent to the trailing brush-tip and a commutator bar just quitted by the main brush or brushes, said critical-voltage, imperfect-contact device being insulated auxiliary brushes bearing on the commutator bars and overlapping the trailing brush-tips of the respective main brushes, characterized by said auxiliary brushes having the property of carrying substantial amounts of current only at voltages exceeding about 6 volts between said commutator bars on opposite sides of the trailing brush-tip.

20. In a commutator-type dynamo-electric machine having a plurality of commutator-brush terminals, the combination, with each terminal, of one or more main brushes disposed in an axial plane and connected to said terminal, and a critical-voltage, imperfect-contact device for providing an auxiliary circuit-connection between a commutator bar under the main brush or brushes adjacent to the trailing brush-tip and a commutator bar just quitted by the main brush or brushes, said critical-voltage, imperfect-contact device being insulated auxiliary brushes bearing on the commutator bars and overlapping the trailing brush-tips of the respective main brushes, characterized by said auxiliary brushes having the property of carrying substantial amounts of current only at voltages exceeding about 6 volts between said commutator bars on opposite sides of the trailing brush-tip and having the property of carrying the maximum currents, under maximum transient current-conditions, at voltages less than 11 volts between said commutator bars on opposite sides of the trailing brush-tip.

21. In a commutator-type dynamo-electric machine having a plurality of commutator-brush terminals, the combination, with each terminal, of one or more main brushes disposed in an axial plane and connected to said terminal, and a critical-voltage, imperfect-contact device for providing an auxiliary circuit-connection between a commutator bar under the main brush or brushes adjacent to the trailing brush-tip and a commutator bar just quitted by the main brush or brushes, said critical-voltage, imperfect-contact device being insulated auxiliary brushes bearing on the commutator bars and overlapping the trailing brush-tips of the respective main brushes, characterized by said auxiliary brushes having the property of carrying the maximum currents, under maximum transient current-conditions, at voltages less than 11 volts between said commutator bars on opposite sides of the trailing brush-tip.

In testimony whereof, we have hereunto subscribed our names this 31st day of August, 1929.

LEON R. LUDWIG.
JOSEPH SLEPIAN.